(12) United States Patent
Jain et al.

(10) Patent No.: US 9,081,950 B2
(45) Date of Patent: Jul. 14, 2015

(54) ENABLING HOST BASED RBAC ROLES FOR LDAP USERS

(75) Inventors: Chethan Jain, Bangalore (IN); Monica Lemay, Cedar Park, TX (US); Yogesh Patgar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/482,435

(22) Filed: May 29, 2012

(65) Prior Publication Data

US 2013/0326588 A1 Dec. 5, 2013

(51) Int. Cl.
| | |
|---|---|
| *H04L 29/06* | (2006.01) |
| *G06F 21/41* | (2013.01) |
| *G06F 7/04* | (2006.01) |
| *G06F 15/16* | (2006.01) |
| *G06F 17/30* | (2006.01) |

(52) U.S. Cl.
CPC ..................................... *G06F 21/41* (2013.01)

(58) Field of Classification Search
CPC ....... G06F 9/4428; G06F 9/466; G06F 9/468; G06F 21/00; G06F 21/62; G06F 21/6218; G06F 21/6236; G06F 21/6281; Y10S 7/99939; H04L 63/20; Y04S 40/24
USPC ............................................................ 726/4
See application file for complete search history.

(56) References Cited

U.S. PATENT DOCUMENTS

| | | | |
|---|---|---|---|
| 6,014,666 A * | 1/2000 | Helland et al. ........................ 1/1 |
| 6,088,679 A * | 7/2000 | Barkley ....................... 705/7.26 |
| 6,892,309 B2 * | 5/2005 | Richmond et al. ................. 726/7 |
| 6,947,989 B2 | 9/2005 | Gullotta et al. |
| 6,950,825 B2 * | 9/2005 | Chang et al. .......................... 1/1 |
| 7,124,192 B2 * | 10/2006 | High et al. ..................... 709/229 |
| 7,131,000 B2 * | 10/2006 | Bradee .......................... 713/164 |
| 7,404,203 B2 * | 7/2008 | Ng ..................................... 726/6 |
| 7,640,429 B2 | 12/2009 | Huang et al. |
| 7,827,595 B2 * | 11/2010 | Gociman .......................... 726/4 |
| 7,870,595 B2 * | 1/2011 | Finney et al. ...................... 726/1 |
| 7,913,300 B1 | 3/2011 | Flank et al. |
| 7,921,452 B2 | 4/2011 | Ridlon et al. |
| 7,987,269 B1 * | 7/2011 | Mayhead et al. ............. 709/226 |
| 8,010,991 B2 | 8/2011 | Sarukkai et al. |
| 8,032,558 B2 * | 10/2011 | Carter et al. ................... 707/786 |
| 8,136,147 B2 * | 3/2012 | Koikara et al. ..................... 726/4 |
| 8,161,173 B1 * | 4/2012 | Mishra et al. ................. 709/229 |
| 8,261,331 B2 * | 9/2012 | Choudhary et al. .............. 726/5 |
| 8,271,527 B2 * | 9/2012 | Frieder et al. ................. 707/783 |

(Continued)

FOREIGN PATENT DOCUMENTS

| | | | |
|---|---|---|---|
| WO | WO 2011030755 A1 * | 3/2011 |
| WO | WO 2012042734 A1 * | 4/2014 |

*Primary Examiner* — Shin-Hon Chen
(74) *Attorney, Agent, or Firm* — Thomas E. Tyson; Gregory K. Goshorn; Greg Goshorn, P.C.

(57) ABSTRACT

Provided are techniques for receiving, from a user, a first Role-Based Access Control (RBAC) request for access to a resource; correlating the first RBAC request to a first originating host device; mapping an ID corresponding to the user, the first originating host device and the resource to a first role; generating, based upon the first role, a first set of permissions corresponding to the resource; and enabling to the user to access the resource from the first originating host device in conformity with the first set of permissions. In addition to ID, host and resource, a communication medium may be factored into the mapping.

17 Claims, 4 Drawing Sheets

(56) References Cited

U.S. PATENT DOCUMENTS

| | | |
|---|---|---|
| 8,381,306 B2 * | 2/2013 | McPherson et al. ............ 726/27 |
| 8,402,514 B1 * | 3/2013 | Thompson et al. ............... 726/4 |
| 8,448,240 B2 * | 5/2013 | Hammoutene et al. ......... 726/21 |
| 8,458,337 B2 * | 6/2013 | Corley et al. .................. 709/227 |
| 8,595,799 B2 * | 11/2013 | Afek et al. ..................... 726/4 |
| 2002/0095571 A1 * | 7/2002 | Bradee .......................... 713/164 |
| 2002/0178119 A1 | 11/2002 | Griffin et al. |
| 2003/0221012 A1 * | 11/2003 | Herrmann et al. ............ 709/229 |
| 2005/0039041 A1 * | 2/2005 | Shaw et al. .................... 713/200 |
| 2007/0156693 A1 * | 7/2007 | Soin et al. ......................... 707/9 |
| 2007/0180498 A1 * | 8/2007 | Choudhary et al. ............... 726/4 |
| 2008/0034438 A1 * | 2/2008 | Mireku ........................... 726/27 |
| 2008/0120302 A1 * | 5/2008 | Thompson et al. ................ 707/9 |
| 2010/0325724 A1 | 12/2010 | Grebenik et al. |
| 2011/0055907 A1 * | 3/2011 | Narasimhan et al. ............. 726/5 |
| 2011/0219425 A1 * | 9/2011 | Xiong et al. ...................... 726/1 |
| 2012/0210419 A1 * | 8/2012 | Choudhary et al. ............ 726/16 |
| 2012/0331527 A1 * | 12/2012 | Walters et al. .................... 726/4 |

* cited by examiner

ENABLING HOST BASED RBAC ROLES FOR LDAP USERS

FIELD OF DISCLOSURE

The claimed subject matter relates generally to computing and, more specifically, to techniques for restricting access to a computing system based upon defined parameters.

SUMMARY

Provided are techniques for restricting specified authorizations for Role-Based Access Control (RBAC) users in a centralized Lightweight Directory Access Protocol (LDAP) environment. LDAP is a well-known application protocol for accessing and maintaining distributed directory information over an Internet Protocol (IP) network. RBAC is a well-known computer security system in which roles are created for different job functions. Permissions necessary for performing a particular role are established for the role. Users are assigned roles and are granted the corresponding permissions associated with the assigned roles. In other words, users do not acquire permissions directly but rather acquire permissions through the particular user's assigned role or roles.

Provided are techniques for receiving, from a user, a first Role-Based Access Control (RBAC) request for access to a resource; correlating the first RBAC request to a first originating host device; mapping an ID corresponding to the user, the first originating host device and the resource to a first role; generating, based upon the first role, a first set of permissions corresponding to the resource; and enabling to the user to access the resource from the first originating host device in conformity with the first set of permissions. In addition to ID, host and resource, a communication medium may be factored into the mapping.

Further, the claimed technology, may also include receiving, from the user, a second Role-Based Access Control (RBAC) request for access to the resource; correlating the second RBAC request to a second originating host device; mapping the ID corresponding to the user, the second originating host and the resource to a second role, wherein the second role is a different role than the first role; generating a second set of permissions corresponding to the second role, wherein the second set of permissions is a different set of permissions than the first set of permissions; and enabling the user to access the resource from the second originating device in conformity with the second set of permissions.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
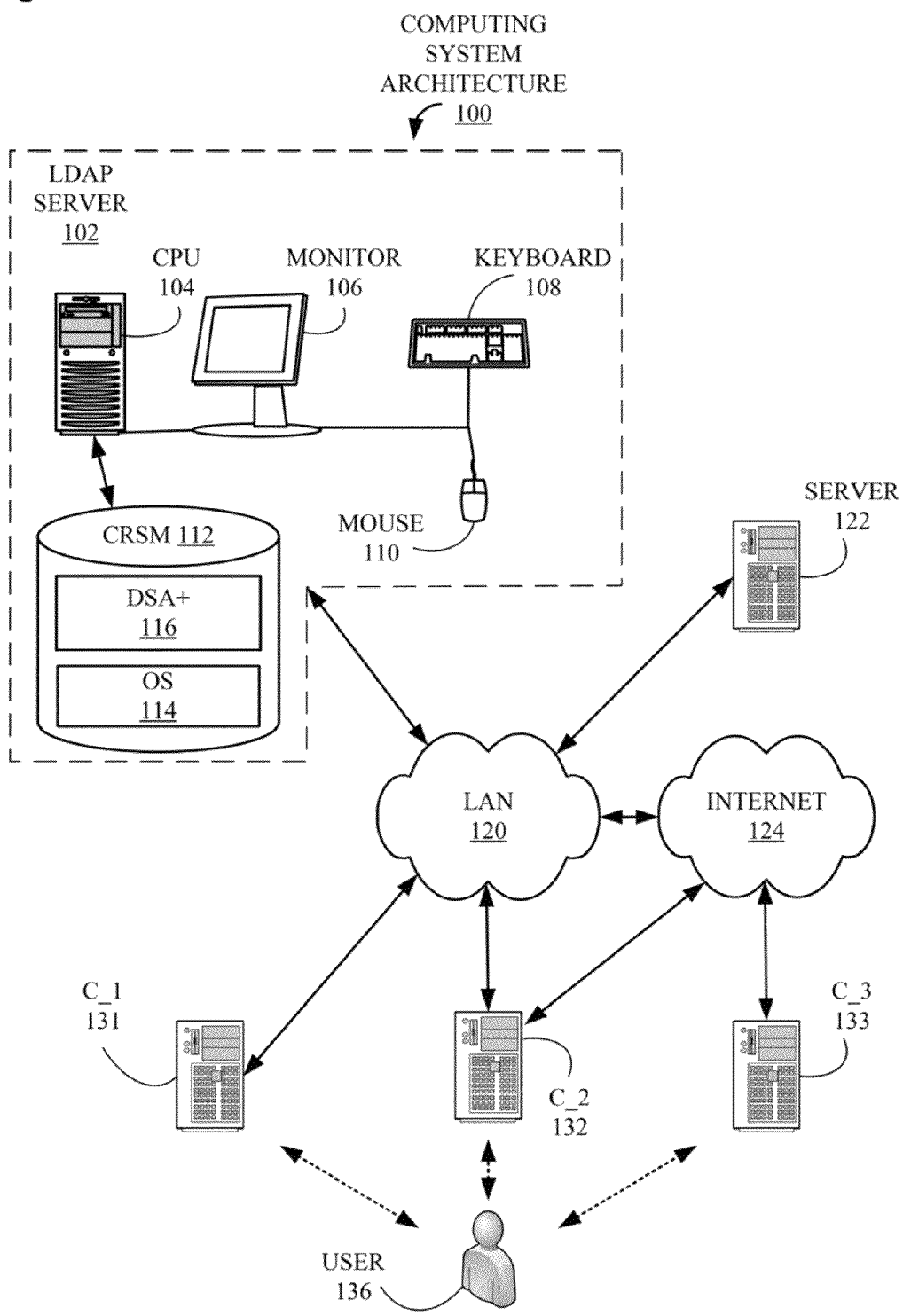
FIG. 1 is a block diagram or a computing system architecture on which the claimed subject matter may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of a computing system architecture 100 on which the claimed subject matter may be implemented. A Lightweight Directory Access Protocol (LDAP) server 102 includes a central processing unit (CPU) 104, coupled to a monitor 106, a keyboard 108 and a pointing device, or "mouse," 110, which together facilitate human interaction with computing system 100 and LDAP server 102.

Also included in LDAP server 102 and attached to CPU 104 is a computer-readable storage medium (CRSM) 112, which may either be incorporated into LDAP server 102 i.e. an internal device, or attached externally to CPU 104 by means of various, commonly available connection devices such as but not limited to, a universal serial bus (USB) port (not shown). CRSM 112 is illustrated storing an operating system (OS) and a Directory Service Agent Plus (DSA+) 116. DSA+ 116 represents a security access system that provides, in addition to services normally attributed to a typical Directory Service Agent (DSA), a distributed and flexible security policy for enabling access to various resources and applications on computing system architecture 100. DSA+ 116 is described in more detail below in conjunction with FIGS. 2-5.

LDAP server 102 is communicatively coupled to a local area network (LAN) 120. Coupled to LAN 120 is a server 122, which is used throughout the Specification as an example of a resource to which LDAP server 102 controls access. It should be noted that server 122 is one simple example of a access controlled resource and that one with skill in the relevant arts should be familiar with many different types of resources that a LDAP server might provide access control. Also coupled to LAN 120 is the Internet 124 and two (2) computing systems, i.e., a C_1 131 and a C_2 132. Coupled to the Internet 124 is C_2 132 and a third computing system, i.e., a C-3 133. Each of computing systems 131-133 would typically include a CPU, monitor, a keyboard, a mouse and a CRSM but for the sake of simplicity those components are not illustrated. A user 136 is illustrated, by means of dotted lines, have access to each of computing systems 131-133 and, via computing systems 131-133 and one or both of LAN 120 and Internet 124, to LDAP server 102, DSA+ 116 and server 122.

Although in this example LDAP server 102, computing systems 131-133 and server 124 are communicatively coupled via one or both of LAN 120 and Internet 124, they could also be coupled through any number of communication mediums such as, but not limited to, a wide area network (WAN) and direct wire and wireless connections. Further, it should be noted there are many possible computing system configurations, of which computing system architecture 100 is only one simple example.

Figure 2:
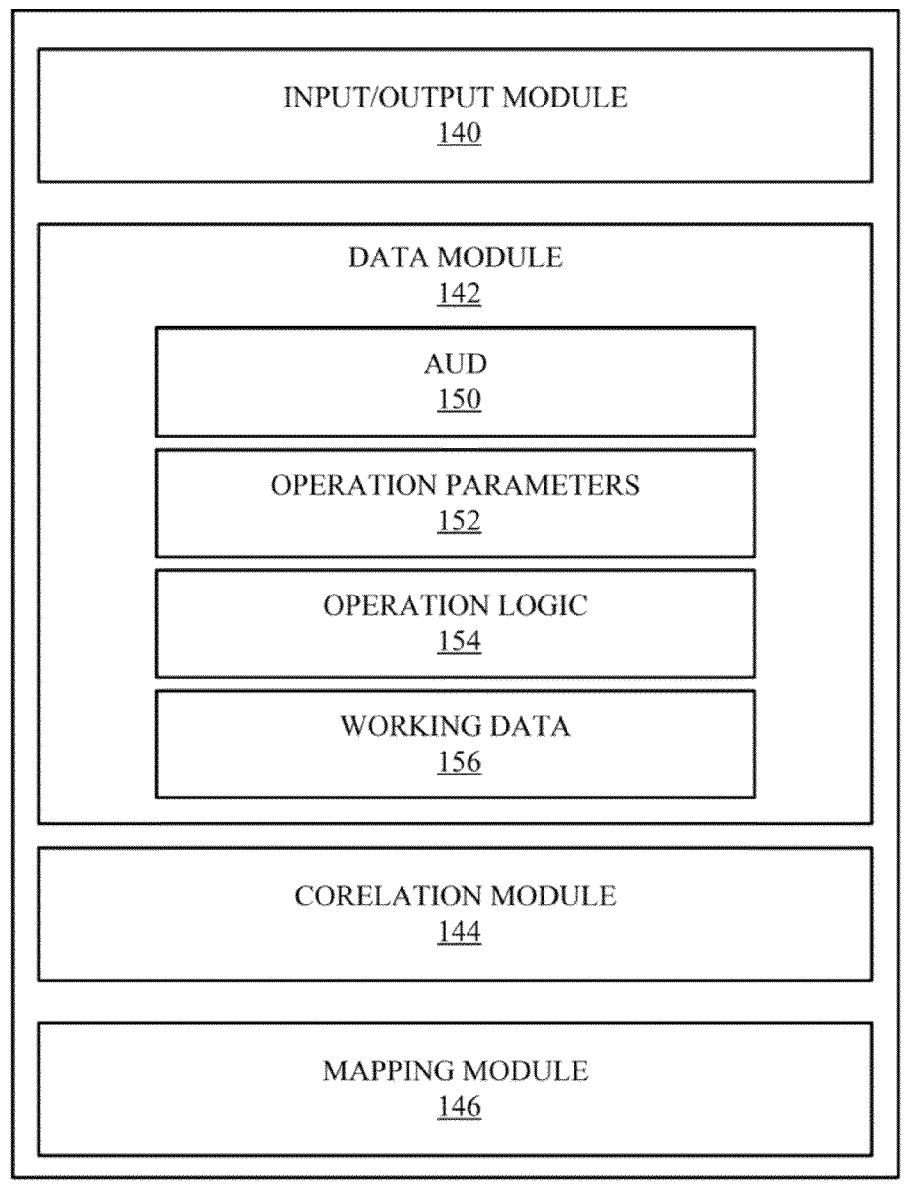
FIG. 2 is a block diagram of a Directory Service Agent Plus (DSA+) that may implement aspects of the claimed subject matter.

FIG. 2 is a block diagram of DSA+ 116 first introduced above in conjunction with FIG. 1. DSA+ 116 includes an Input/Output (I/O) module 140, a data cache 142, a correlation module 144 and a mapping module 146. For the sake of the following description, DSA+ 116 is assumed to execute on CPU 104 (FIG. 1) of LDAP server 102 (FIG. 1) and be stored on CRSM 112 (FIG. 1). It should be understood that the claimed subject matter can be implemented in many types of Computing systems and data storage structures but, for the sake of simplicity, is described only in terms of LDAP server 102 and system architecture 100 (FIG. 1). Further, the representation of DSA+ 116 in FIG. 2 is a logical model. In other words, components 140, 142, 144 and 146 may be stored in the same or separates files and loaded and/or executed within system 100 either as a single system or as separate processes interacting via any available inter process communication (IPC) techniques.

I/O module 140 handles any communication DSA+ 116 has with other components, both shown and not shown, of system 100, including but not limited to, components of LDAP server 102, server 122, LAN 120, the Internet 126 and computing systems 131-133. Data cache 142 is a data repository for information, including settings and lists, that backup monitor requires during normal operation. Examples of the types of information stored in data cache 142 include an Augmented User Directory (AUD) 150, operation parameters 152, operation logic 154 and working data 156.

AUD 150, which is described in more detail below in conjunction with FIG. 3, stores information on various users, such as user 136 (FIG. 1), computing systems such as server 122 and computing systems 131-133 and various roles that might be assigned to a user. Operation parameters 152 includes information on various administrative preferences that are set to control the operation of DSA+ 116. For example, an administrator (not shown) may define a default access level and set timeout values for the establishment of a connection and completion of an access request. An administrator may set parameters to specify various roles and each role's correspondence to both users and computing systems. In addition, an administrator may define algorithms for making a determination as to specific access rights corresponding to a particular access request and define conflict resolution procedures when different algorithms provide conflicting results. Operation logic 154 stores executable code to implement DSA+ 116 on LDAP server 122. Working data 156 stores the results of ongoing and intermediate operations of DSA+ 116.

Correlation module 144, in response to an access request received by DSA+ 116, searches AUD 150 for information relating to the user submitting the access request, the computing system from which the user is submitting the request and the resource to which the user is requesting access. For example, an access request may arrive from user 136 who is attempting to access server 122 from C_3 133.

Mapping module 146 processes the information retrieved by correlation module 144 to establish the parameters of the particular access request. For example, using the example directly above, mapping module 146 establishes a role for user 136 with respect to both C_3 133 and server 122. In other words, user 136 may assume different roles depending upon the particular computing system 131-133 and resource to which access is requested. One specific example is that user 136 may be considered an administrator of server 122 when accessing via C_1 131 or C_2 132 because the connection is via LAN 120 but user 136 may be deemed to be a relatively unprivileged user if attempting to access server 122 via C_3 133 and the Internet 124. The operation of components 142, 144, 146, 150, 152, 154 and 156 is described in more detail below in conjunction with FIGS. 3-5.

Figure 3:
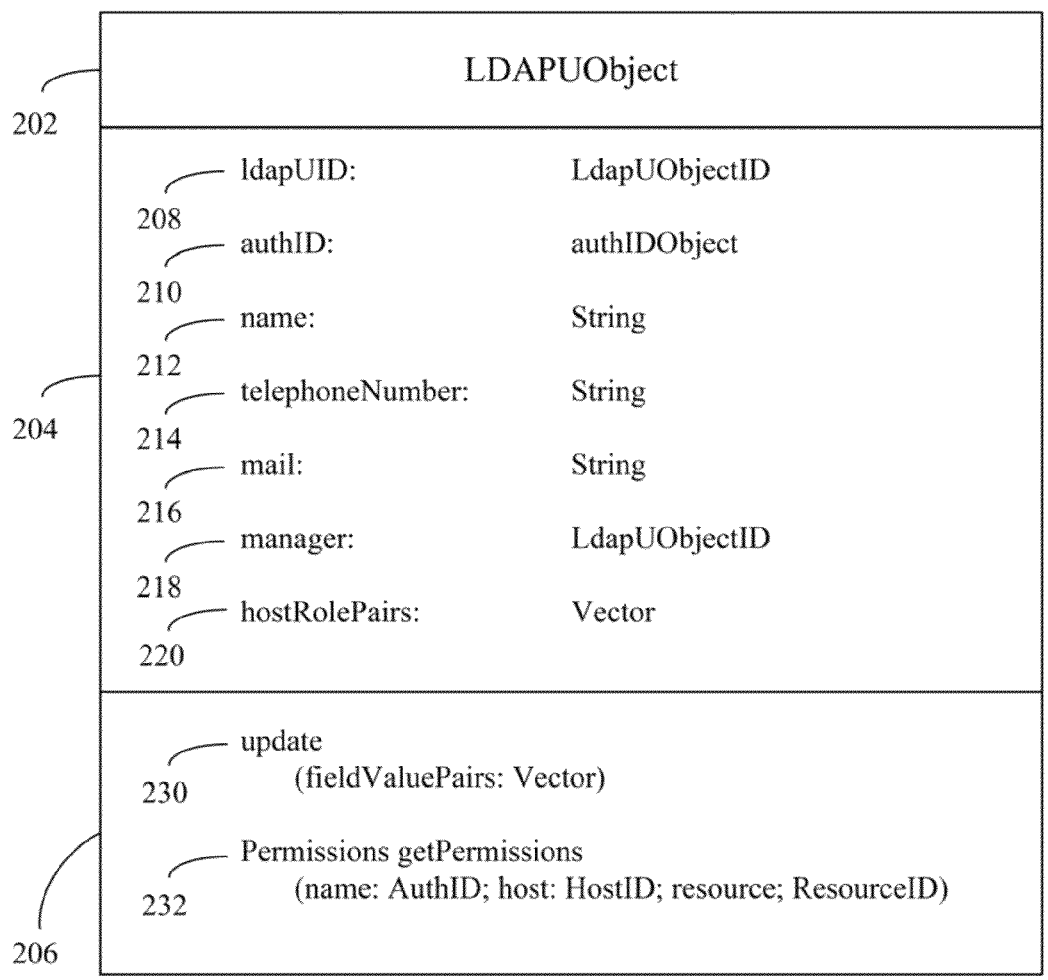
FIG. 3 is a block diagram an Augmented User Directory (AUD) object that may be employed by DSA+ to implement aspects of the claimed subject matter.

FIG. 3 is a block diagram an LDAP User data object (LDAPUO) 200, stored in AUD 150 (FIG. 2) that may be employed by DSA+ 116 to implement aspects of the claimed subject matter. LDAPUO 200 includes a title section 202, which merely states the name of object 200, i.e. "LDAPUObject," an attribute section 204, which contains memory elements, or attributes, associated with LDAPUO 200, and a method section 206, which includes functions, or methods, that may be executed in conjunction with LDAPUO 200. It should be noted that the attributes and methods described are used for the purpose of illustration only. Additional and/or different attributes and methods may be employed to implement the claimed subject matter. For example, although not illustrated, AUD 150 also includes data structures to identify and save information corresponding to, but not limited to, roles, hosts and servers.

Attribute section 202 includes an "ldapUID" attribute 208, a "authID" attribute 210, a "name" attribute 212, a "telephoneNumber" attribute 214, a "mail" attribute 216, a "dates" attribute 218, a "relationships" attribute 220, a "classifications" attribute 222, a "manager" attribute 224 and a "hostRolePairs" attribute 226. Instantiations of object 200 are stored in AUD 150 (FIG. 1) on CRSM 112 (FIG. 1).

LdapUID attribute 208 is a variable of type LdapUObjectID that contains a reference to the particular instance of object 200. Each instance of object 200 has a unique value for attribute 208 that allows each instance to be uniquely identified. AuthID attribute 210 is a variable of type authIDObject that stores an identifier that uniquely identifies a user such as user 136 (FIG. 1). Name attribute 212 is a variable of type String that stores the name of the user uniquely identified by attribute 210. TelephoneNumber attribute 214 is a variable of type String that stores a telephone number for the user identified by attribute 210. Mail attribute 216 is a variable of type String that stores an email address for the user identified by attribute 210. Manager attribute 218 is a variable of type LdapUObjectID that stores a reference to a different object 200 that stores the information corresponding to the manager of the user identified by attribute 210.

HostRolePairs attribute 220 is a variable of type Vector that stores host names and corresponding roles with respect to that host for the user identified by attribute 210. For example, one of potentially multiple values for attribute may identify a host such as C_1 131 (FIG. 1) and specify that the user identified by attribute 210 has been assigned a role of a full administrator of C_1 131. A second value stored in conjunction with attribute 220 may specify that, with respect to C_3 133, the user identified by attribute 210 is assigned a role that permits minimal administration or that of a simple user of the and requested resource. In addition, ant particular host, such as C_2 132 may have a different record with respect to different communication mediums. For example, C_2 132 may have one hostRolePair attribute 220 for communicating via LAN 120 (FIG. 1) and a different hostRolePair attribute 220 for communicating via Internet 124 (FIG. 1).

Method section 206 of object 200 includes two exemplary functions, or methods. Only two methods are illustrated for the sake of simplicity. Those with skill in the programming arts should appreciate that an object such as object 200 would typically include many additional methods including, but not limited to, constructors, destructors, and methods to set and get values for various attributes.

An "update" method 230 is called to set, typically by an administrator, values for attributes 208, 210, 212, 214, 216, 218 and 220. In this example, method 230 is called with one (1) parameter: a "fieldValuePair" that is a variable of type Vector. Each entry, or record, of the vector refers to one of the fields 208, 210, 212, 214, 216, 218 or 220 and a corresponding value to which the filed should be set. Invoking method 230 causes the specified fields to be assigned the corresponding values.

A "getPermissions" method 232 is used to determine a specified user's permissions, or role, with respect to a particular host and service. In this example, method 232 is called with three (3) parameters: a "name" that is a variable of type AuthID; a "host" that is a variable of type HostID; and a "resource" that is a variable of type ResourceID. Name parameter uniquely identifies a user that is the subject of the call to method 232 (see 210). Host parameter identifies a host such as computing system 131-133 from which the identified user is attempting to gain access to a resource identified by resource parameter. The disclosed technology may also include safeguards that prevent a caller of method 232 from "spoofing." with respect to the host. In other words, the host parameter may be set by the host system that originated the access request, by LDAP server 102 or DSA+ 116 based upon the true source of the request. Further, host parameter may be protected from modification by a user that originates the request.

It should be understood that LDAPUO 200 is only one example of a memory object that may be used to implement the claimed subject matter. Other memory objects with fewer, more and/or different attributes and methods may be employed. For example, as explained above, AUD 150 may also include data structures to identify and save information corresponding to, but not limited to, roles, hosts and servers. In addition, there are many ways other than employing object 200 to implement the functionality and data storage of the claimed subject matter. For example, the claimed subject matter may be implemented by means of a computer program in conjunction with a relational database.

Figure 4:
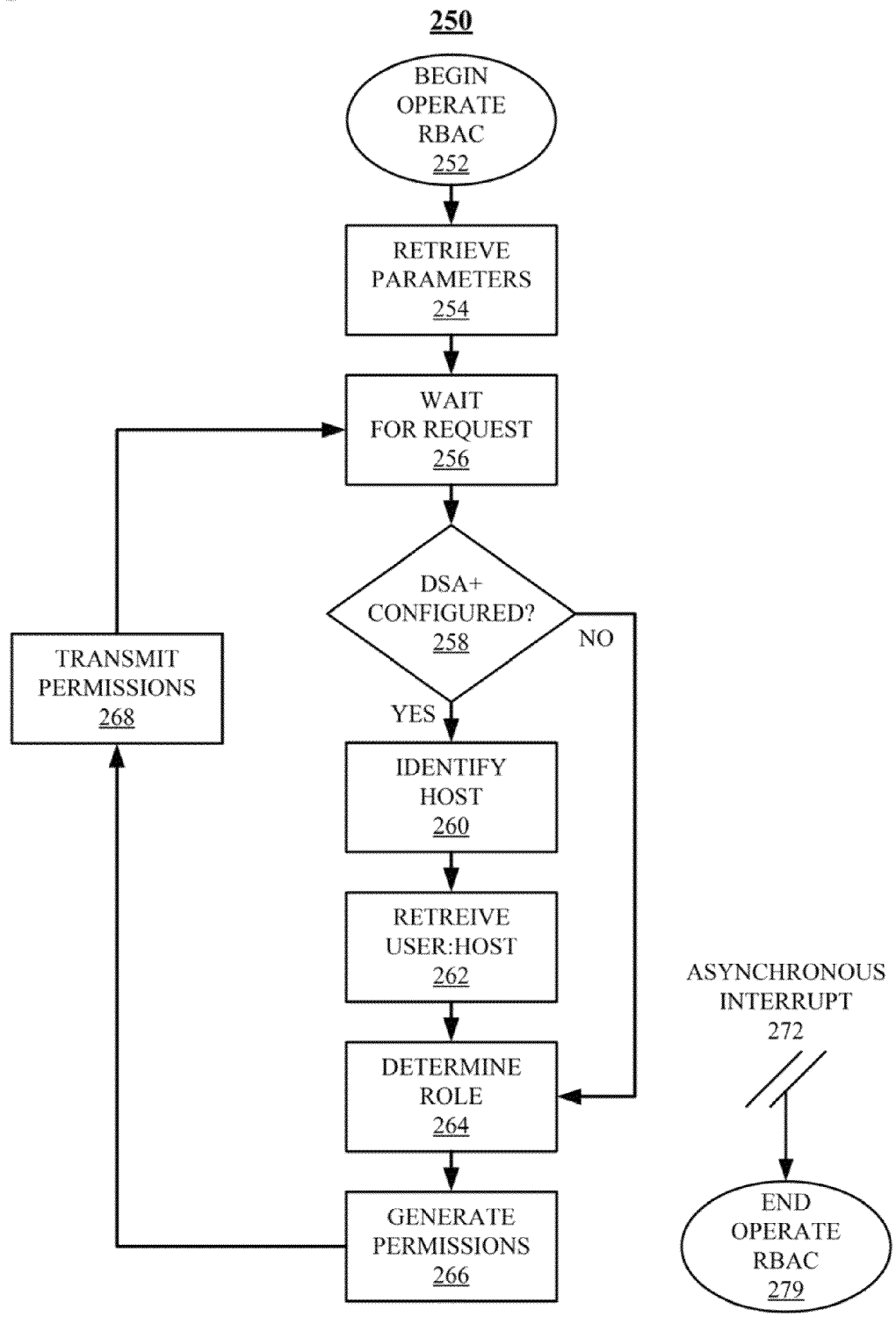
FIG. 4 is a flowchart of an Operate RBAC Service that is one example of an implementation of the claimed subject matter.

FIG. 4 is a flowchart of an Operate RBAC Service process 250 that may implement aspects of the claimed subject matter. In this example, logic associated with process 250 is stored in CRSM 112 (FIG. 1) and executes on one or more processors (not shown) of LDAP server 102 (FIG. 1) and CPU 104 (FIG. 1) in conjunction with DSA+ (FIGS. 1 and 2).

Process 250 starts in a "Begin Operate RBAC" block 252 and proceeds immediately to a "Retrieve Parameters" block 254. During processing associated with block 254, configuration parameters (see 152, FIG. 2) for controlling the operation of DSA+ 116 are retrieved from memory. During processing associated with a "Wait for Request" block 256, process 250 waits for a LDAP request from a user for access to a computing resource. In the following example, a request is received from user 136 (FIG. 1) who is transmitting the request from one of clients 131-132 (FIG. 1).

During processing associated with a "DSA+ Configured?" block 258, a determination is made as to whether or not the request received during processing associated with block 256 conforms to protocols associated with DSA+ enhanced features. For example, the request must include an indication from which of clients 131-133 that the request originated. If a determination is made that the request does conform to the protocols necessary to implement the enhanced features, process 250 proceeds to an "Identify Host" block 260. During processing associated with block 260; the host, which in this example is one of C_1 131, C_2 132 or C_3 133, is ascertained. In addition, the medium over which the identified host is communicating, e.g. LAN 120 (FIG. 1) or Internet 124 (FIG. 1), may be identified. In this manner, the disclosed technology may treat a single host as two different hosts, depending upon the communication medium, for the sake of assigning permissions to a resource to a particular user.

During processing associated with a "Retrieve User:Host" block 262, information corresponding to user 136 and the host identified during processing associated with block 260 is retrieved from AUD 150 (FIG. 2). Such information is stored in an attribute such as hostRolePairs attribute 220 (FIG. 3) of a data object such as LDAPUObject 200 (FIG. 3) associated with user 136. It should be noted that, as explained above with respect to FIG. 3, a particular host such as C_2 132 may have one hostRolePair attribute 220 for communicating via LAN 120 (FIG. 1) and a different hostRolePair attribute 220 for communicating via Internet 124 (FIG. 1). In this manner, one role may be assigned to a particular user on a particular host over one communication medium and a second role assigned to the particular user on the particular host over a second communication medium.

During processing associated with a "Determine Role" block 264, the user 136 is correlated (see 144 FIG. 2) with a role based upon corresponding the hostRolePairs attribute 220 and the particular client 131-133 from which the request originated. As explained above, the particular communication medium may also be a factor in determining an appropriate role for a particular user. It should be noted that in a typical DSA scenario the originating host is not factored into a decision to assign a role to user 136 in which case block 264 would typically be entered from block 258 rather than block 262.

During processing associated with a "Generate Permissions" block 266, user 136 is assigned a role based upon the information in the hostRolePairs attribute 220 retrieved during processing associated with block 262 or, if control has passed directly from block 258, a role is assigned in a typical DSA manner. During processing associated with a "Transmit Permissions" block 268, the permissions associated with the role determined during processing associated with block 266 are transmitted in the form of credentials to user 136, who may then employ the credentials to assess the desired role with the appropriate permissions. Control then returns to Wait for Request block 256 during which process 250 awaits a next request and processing continues as described above.

Although not illustrated there may also be means for a particular resource to check credentials with respect to a host from which a user is accessing the resource. For example, the resource may validate a user from one originating host based upon one set of credentials, or permissions, and validate the user from a second originating host based upon a second set of permissions. The disclosed techniques also provide for preventing the user from employing the first permissions from the second host and the second permissions from the first host.

Finally, process 250 is halted by means of an interrupt 272, which passes control to an "End Operate RBAC" block 279 in which process 250 is complete. Interrupt 272 is typically generated when the computing system, OS, RSA+ 116, of which process 250 is a part is itself halted. During normal operation, process 250 continuously loops through blocks 256, 258, 260, 245, 262, 264, 266 and 268, processing credential requests as they are received.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
receiving, from a user, a first Role-Based Access Control (RBAC) request for access to a resource;

correlating the first RBAC request to a first originating host device;
mapping an ID corresponding to the user, the first originating host device and the resource to a first role;
generating, based upon the first role, a first set of permissions corresponding to the resource;
enabling to the user to access the resource from the first originating, host device in conformity with the first set of permissions;
receiving, from the user, a second Role-Based Access Control (RBAC) request for access to the resource;
correlating the second RBAC request to a second originating host device;
mapping the ID corresponding to the user, the second originating host and the resource to a second role, wherein the second role is a different role than the first role;
generating a second set of permissions corresponding to the second role, wherein the second set permissions is a different set of permissions than the first set of permissions; and
enabling the user to access the resource from the second originating device in conformity with the second set of permissions;
wherein the mapping with respect to the first role and the mapping with respect to the second role are based upon a first communication medium and a second communication medium, wherein the first communication medium is a different communication medium that the second communication medium.

2. The method of claim 1, wherein the mapping takes into account a communication medium from which the RBAC request is received.

3. The method of claim 1, wherein the first RBAC request is received in a centralized Lightweight Directory Access Protocol (LDAP) environment.

4. The method of claim 1, the enabling comprising transmitting credentials corresponding to the first set of permissions to the user.

5. An apparatus, comprising:
a processor;
a non-transitory computer-readable storage medium coupled to the processor; and
logic, stored on the computer-readable storage medium and executed on the processor, for:
receiving, from a user, a first Role-Based Access Control (RBAC) request for access to a resource;
correlating the first RBAC request to a first originating host device;
mapping an ID corresponding to the user, the first originating host device and the resource to a first role;
generating, based upon the first role, a first set of permissions corresponding to the resource;
enabling to the user to access the resource from the first originating host device in conformity with the first set of permissions;
receiving, from the user, a second Role-Based Access Control (RBAC) request for access to the resource;
correlating the second RBAC request to a second originating host device;
mapping the ID corresponding to the user, the second originating host and the resource to a second role, wherein the second role is a different role than the first role;
generating a second set of permissions corresponding to the second role, wherein the second set of permissions is a different set of permissions than the first set of permissions; and
enabling the user to access the resource from the second originating device in conformity with the second set of permissions;
wherein the logic for mapping with respect to the first role and the logic for mapping with respect to the second role are based upon a first communication medium and a second communication medium, wherein the first communication medium is a different communication medium that the second communication medium.

6. The apparatus of claim 5, wherein the logic for mapping takes into account a communication medium from which the RBAC request is received.

7. The apparatus of claim 5, wherein the first RBAC request is received in a centralized Lightweight Directory Access Protocol (LDAP) environment.

8. A computer programming product, comprising:
a non-transitory computer-readable storage medium; and
logic, stored on the computer-readable storage medium for execution on a processor, for:
receiving, from a user, a first Role-Based Access Control (RBAC) request for access to a resource;
correlating the first RBAC request to a first originating host device;
mapping an ID corresponding to the user, the first originating host device and the resource to a first role;
generating, based upon the first role, a first set of permissions corresponding to the resource;
enabling to the user to access the resource from the first originating host device in conformity with the first set of permissions;
receiving, from the user, a second Role-Based Access Control correlating the second RBAC request to a second originating host device;
mapping the ID corresponding to the user, the second originating host and the resource to a second role, wherein the second role is a different role than the first role;
generating a second set of permissions corresponding to the second role, wherein the second set of permissions is a different set of permissions than the first set of permissions; and
enabling the user to access the resource from the second originating device in conformity with the second set of permissions;
wherein the logic for mapping with respect to the first role and the logic for mapping with respect to the second role are based upon a first communication medium and a second communication medium, wherein the first communication medium is a different communication medium that the second communication medium.

9. The computer programming product of claim 8, wherein the logic for mapping takes into account a communication medium from which the RBAC request is received.

10. The computer programming product of claim 8, wherein the first RBAC request is received in a centralized Lightweight Directory Access Protocol (LDAP) environment.

11. A role-based access control (RBAC) server, comprising:
a computer-readable storage medium; and
logic, stored on the computer-readable storage medium for execution on a processor, for:
receiving, from a user, a first RBAC request for access to a resource;

correlating the first RBAC request to a first originating host device;
mapping an ID corresponding to the user, the first originating host device and the resource to a first role;
generating, based upon the first role, a first set of permissions corresponding to the resource;
enabling to the user to access the resource from the first originating host device in conformity with the first set of permissions;
receiving, from the user, a second Role-Based Access Control (RBAC) request for access to the resource;
correlating the second RBAC request to a second originating host device;
mapping the ID corresponding, to the user, the second originating host and the resource to a second role, wherein the second role is a different role than the first role;
generating a second set of permissions corresponding to the second role, wherein the second set of permissions is a different set of permissions than the first set of permissions; and
enabling the user to access the resource from the second originating device in conformity with the second set of permissions;
wherein the logic for mapping with respect to the first role and the logic for mapping with respect to the second role are based upon a first communication medium and a second Communication medium, wherein the first communication medium is a different communication medium that the second communication medium.

12. The RBAC server of claim 11, wherein the logic for mapping takes into account a communication medium from which the RBAC request is received.

13. The RBAC server of claim 11, wherein the first RBAC request is received in a centralized Lightweight Directory Access Protocol (LDAP) environment.

14. A method, comprising:
receiving, from a user, a first Role-Based Access Control (RBAC) request for access to a resource;
correlating the first RBAC request to a first originating host device;
mapping an ID corresponding to the user, the first originating host device and the resource to a first role;
generating, based upon the first role, a first set of permissions corresponding to the resource;
enabling to the user to access the resource from the first originating host device in conformity with the first set of permissions;
receiving, from the user, a second Role-Based Access Control (RBAC) request for access to the resource;
correlating the second RBAC request to a second originating host device;
mapping the ID corresponding to the user, the second originating host and the resource to a second role, wherein the second role is a different role than the first role;
generating a second set of permissions corresponding to the second role, wherein the second set of permissions is a different set of permissions than the first set of permissions;
enabling the user to access the resource from the second originating device in conformity with the second set of permissions;
preventing the user from accessing the resource from the first originating device in conformity with the second set of permissions; and
preventing the user from accessing the resource from the second originating device in conformity with the first set of permissions.

15. An apparatus, comprising:
a processor;
a computer-readable storage medium coupled to the processor; and
logic, stored on the computer-readable storage medium and executed on the processor, for:
receiving, from a user, a first Role-Based Access Control (RBAC) request for access to a resource;
correlating the first RBAC request to a first originating host device;
mapping an ID corresponding to the user, the first originating host device and the resource to a first role;
generating, based upon the first role, a first set of permissions corresponding to the resource;
enabling, to the user to access the resource from the first originating host device in conformity with the first set of permissions;
receiving, from the user, a second Role-Based Access Control (RBAC) request for access to the resource;
correlating the second RBAC request to it second originating host device;
mapping the ID corresponding to the user, the second originating host and the resource to a second role, wherein the second role is a different role than the first role;
generating a second set of permissions corresponding to the second role, wherein the second set of permissions is a different set of permissions than the first set of permissions;
enabling the user to access the resource from the second originating device in conformity with the second set of permissions;
preventing the user from accessing the resource from the first originating device in conformity with the second set of permissions; and
preventing the user from accessing the resource from the second originating device in conformity with the first set of permissions.

16. A computer programming product, comprising:
a non-transitory computer-readable storage medium; and
logic, stored on the computer-readable storage medium for execution on a processor, for:
receiving, from a user, a first Role-Based Access Control (RBAC) request for access to a resource;
correlating the first RBAC request to a first originating, host device;
mapping an ID corresponding to the user, the first originating host device and the resource to a first role;
generating, based upon the first role, a first set of permissions corresponding to the resource;
enabling to the user to access the resource from the first originating host device in conformity with the first set of permissions;
receiving, from the user, a second Role-Based Access Control (RBAC) request for access to the resource;
correlating the second RBAC request to a second originating host device;
mapping the ID corresponding to the user, the second originating host and the resource to a second role, wherein the second role is a different role than the first role;

generating a second set of permissions corresponding to the second role, wherein the second set of permissions is a different set of permissions than the first set of permissions;

enabling the user to access the resource from the second originating device in conformity with the second set of permissions;

preventing the user from accessing the resource from the first originating device in conformity with the second set of permissions; and preventing the user from accessing the resource from the second originating device in conformity with the first set of permissions.

17. A role-based access control (RBAC) server, comprising;

a computer-readable storage medium; and logic, stored on the computer-readable storage medium for execution on a processor, for:

receiving, from a user, a first RBAC request for access to a resource;

correlating the first RBAC request to a first originating host device;

mapping an ID corresponding to the user, the first originating host device and the resource to a first role;

generating, based upon the first role, a first set of permissions corresponding to the resource;

enabling to the user to access the resource from the first originating host device in conformity with the first set of permissions;

receiving, from the user, a second Role-Based Access Control (RBAC) request for access to the resource;

correlating the second RBAC request to a second originating host device;

mapping the ID corresponding to the user, the second originating host and the resource to a second role, wherein the second role is a different role than the first role;

generating a second set of permissions corresponding to the second role, wherein the second set of permissions is a different set of permissions than the first set of permissions;

enabling, the user to access the resource from the second originating device in conformity with the second set of permissions;

preventing the user from accessing the resource from the first originating device in conformity with the second set of permissions; and preventing the user from accessing the resource from the second originating device in conformity with the first set of permissions.

* * * * *